(12) United States Patent
Sharma et al.

(10) Patent No.: US 7,625,598 B2
(45) Date of Patent: Dec. 1, 2009

(54) SILICONE CONTACT LENSES WITH WRINKLED SURFACE

(75) Inventors: Ravi Sharma, Fairport, NY (US); Robert M. Braun, Penfield, NY (US); Daniel M. Ammon, Jr., Penfield, NY (US); Jay F. Kunzler, Canandaigua, NY (US); Yu-Chin Lai, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 412 days.

(21) Appl. No.: 11/611,317

(22) Filed: Dec. 15, 2006

(65) Prior Publication Data

US 2008/0143956 A1    Jun. 19, 2008

(51) Int. Cl.
*B05D 5/06* (2006.01)
(52) U.S. Cl. .................................. 427/162; 427/164
(58) Field of Classification Search .......... 427/160–169
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,055,378 A | 10/1977 | Feneberg et al. | |
| 4,099,859 A * | 7/1978 | Merrill | 351/160 H |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,197,266 A | 4/1980 | Clark et al. | |
| 4,214,014 A | 7/1980 | Hofer et al. | |
| 4,312,575 A | 1/1982 | Peyman et al. | |
| 4,314,068 A | 2/1982 | Novicky | |
| 4,632,844 A | 12/1986 | Yanagihara et al. | |
| 4,740,533 A | 4/1988 | Su et al. | |
| 4,910,277 A | 3/1990 | Bambury et al. | |
| 4,954,587 A | 9/1990 | Mueller | |
| 5,010,141 A | 4/1991 | Mueller | |
| 5,034,461 A | 7/1991 | Lai et al. | |
| 5,070,215 A | 12/1991 | Bambury et al. | |
| 5,079,319 A | 1/1992 | Mueller | |
| 5,135,297 A | 8/1992 | Valint, Jr. | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Kunzler et al. | |
| 5,326,584 A | 7/1994 | Kamel et al. | |
| 5,358,995 A | 10/1994 | Lai et al. | |
| 5,374,662 A | 12/1994 | Lai et al. | |
| 5,387,662 A | 2/1995 | Kunzler et al. | |
| 5,496,871 A | 3/1996 | Lai et al. | |
| 5,726,733 A | 3/1998 | Lai et al. | |
| 5,760,100 A | 6/1998 | Nicolson et al. | |
| 6,193,369 B1 | 2/2001 | Valint, Jr. et al. | |
| 6,200,626 B1 | 3/2001 | Grobe, III et al. | |
| 6,213,604 B1 | 4/2001 | Valint, Jr. et al. | |
| 6,348,507 B1 * | 2/2002 | Heiler et al. | 514/769 |
| 6,428,839 B1 | 8/2002 | Kunzler et al. | |
| 6,440,571 B1 | 8/2002 | Valint, Jr. et al. | |
| 6,550,915 B1 | 4/2003 | Grobe, III | |
| 6,599,559 B1 | 7/2003 | McGee et al. | |
| 6,630,243 B2 | 10/2003 | Valint, Jr. et al. | |
| 6,638,563 B2 | 10/2003 | McGee et al. | |
| 6,779,888 B2 | 8/2004 | Marmo | |
| 2003/0039748 A1 | 2/2003 | Valint, Jr. et al. | |
| 2003/0151718 A1 | 8/2003 | Marmo et al. | |
| 2005/0045589 A1 | 3/2005 | Rastogi et al. | |

FOREIGN PATENT DOCUMENTS

| | | |
|---|---|---|
| WO | WO 95/04609 | 2/1995 |
| WO | WO 96/31792 | 10/1996 |
| WO | WO 00/71611 A1 | 11/2000 |
| WO | WO 01/34312 A1 | 5/2001 |
| WO | WO 2004/060431 A1 | 7/2004 |

OTHER PUBLICATIONS

Yu-Chin Lai, "The Role of Bulky Polysiloxanylalkyl Methacrylates in Polyurethane-Polysiloxane Hydrogels," Journal of Applied Polymer Science, John Wiley & Sons, Inc., 1996, (Rochester, New York), p. 1193-1199.

* cited by examiner

*Primary Examiner*—Michael Cleveland
*Assistant Examiner*—Michael G Miller
(74) *Attorney, Agent, or Firm*—John F. Thomas

(57) ABSTRACT

At least one of the surfaces of a silicone contact lens is a wrinkled surface, providing the contact lens surface with a desired topography. The wrinkled surface may include random ridges, either over the entire surface of the lens, or in a desired pattern on the surface of the lens.

14 Claims, No Drawings

SILICONE CONTACT LENSES WITH WRINKLED SURFACE

FIELD OF THE INVENTION

This invention relates to a silicone contact lens wherein at least one of the surfaces is a wrinkled surface, providing the contact lens surface with a desired topography. Preferably, the wrinkled surface is provided as a silicate coating on the contact lens surface. Generally, the wrinkled surface comprises random ridges, either over the entire surface of the lens, or in a desired pattern on the surface of the lens.

BACKGROUND

Contact lenses made from silicone materials can generally be subdivided into two major classes, namely hydrogels and non-hydrogels. Non-hydrogels do not absorb appreciable amounts of water; whereas, hydrogels can absorb and retain water in an equilibrium state. Hydrogels generally have a water content greater than about ten weight percent and more commonly between about fifteen to about eighty weight percent.

Silicone contact lenses may tend to have relatively hydrophobic, non-wettable surfaces. Thus, various publications disclose methods for rendering the surface of silicone contact lenses more hydrophilic to improve their biocompatibility or wettability by tear fluid in the eye. Examples include U.S. Pat. Nos. 6,193,369; 4,143,949; 5,135,297; 5,726,733; 6,550,915; 6,213,604; 6,348,507; 6,630,243; 6,428,839; 6,200,626; 6,440,571; 6,599,559; 4,055,378; 4,122,942; 4,214,014; U.S. Pat. Nos. 4,143,949; 4,632,844; 4,312,575; 5,326,584; 4,312,575; U.S. Pat. Nos. 4,632,844; 6,638,563; and 5,760,100; WO 01/34312; WO 04/060431; WO 95/04609 and US 2005-0045589. Examples of commercial silicone hydrogel contact lenses include: balafilcon A contact lenses, which include plasma-oxidized silicate surfaces; and lotrafilcon A contact lenses, which include plasma-deposited hydrocarbon coating surfaces.

It is important for contact lenses to be comfortable during wear. Also, it is important to avoid corneal edema, inflammation and other adverse effects resulting from contact lens wear, especially lenses intended for wearing for an extended period of time. Finally, in the case of contact lenses having a modified surface, it is important for the modified surface to be optically clear and able to withstand manufacturing process conditions such as hydration and autoclaving for sterilization, as well as cleaning or disinfection treatments performed by the contact lens wearer.

SUMMARY OF THE INVENTION

The invention provides a silicone contact lens, wherein a surface of the lens is wrinkled and includes raised ridges.

Preferably, a wrinkled surface is provided on a posterior surface of the contact lens, so as to facilitating fluid exchange between the lens and a cornea when the lens is worn.

The invention also provides various methods of achieving the wrinkled surface. Generally, the method comprises: providing a silicone contact lens with a modified surface layer; swelling the contact lens with a polymerizable swelling agent; and polymerizing the swelling agent; whereby the modified surface layer becomes a wrinkled surface.

DETAILED DESCRIPTION OF VARIOUS PREFERRED EMBODIMENTS

The present invention is advantageous for contact lenses made of a silicone-containing polymer, and especially for silicone hydrogel contact lenses intended for continuous wear for an extended period. Hydrogels are a well-known class of materials that comprise hydrated, cross-linked polymeric systems containing water in an equilibrium state. Such materials are usually prepared by polymerizing a mixture containing at least one silicone-containing monomer and at least one hydrophilic monomer. Either the silicone-containing monomer or the hydrophilic monomer may function as a cross-linking agent (a cross-linker being defined as a monomer having multiple polymerizable functionalities) or a separate cross-linker may be employed. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Examples of applicable silicone-containing monomeric units include bulky polysiloxanylalkyl (meth)acrylic monomers. An example of bulky polysiloxanylalkyl (meth)acrylic monomers is represented by the following Formula I:

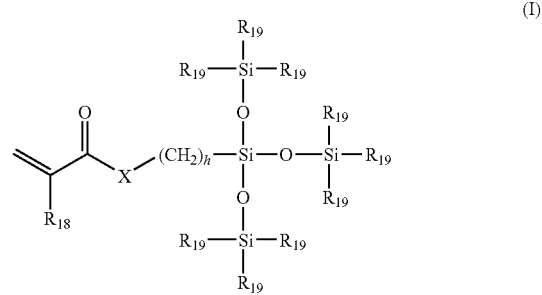
(I)

wherein:

X denotes —O— or —NR—;

each $R_{18}$ independently denotes hydrogen or methyl;

each $R_{19}$ independently denotes a lower alkyl radical, phenyl radical or a group represented by

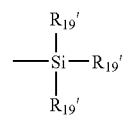

wherein each $R_{19'}$ independently denotes a lower alkyl or phenyl radical; and h is 1 to 10.

Some preferred bulky monomers are methacryloxypropyl tris(trimethyl-siloxy)silane or tris(trimethylsiloxy)silylpropyl methacrylate, sometimes referred to as TRIS and tris (trimethylsiloxy)silylpropyl vinyl carbamate, sometimes referred to as TRIS—VC.

Such bulky monomers may be copolymerized with a silicone macromonomer, which is a poly(organosiloxane) capped with an unsaturated group at two or more ends of the molecule. U.S. Pat. No. 4,153,641 to Deichert et al. discloses, for example, various unsaturated groups, including acryloxy or methacryloxy.

Another class of representative silicone-containing monomers includes silicone-containing vinyl carbonate or vinyl carbamate monomers such as: 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(tri-methylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; and trimethylsilylmethyl vinyl carbonate.

Another class of silicone-containing monomers includes polyurethane-polysiloxane macromonomers (also sometimes referred to as prepolymers), which may have hard-soft-hard blocks like traditional urethane elastomers. Examples of silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae II and III:

(II)

(III)

wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;
a is at least 1;
A denotes a divalent polymeric radical of Formula IV:

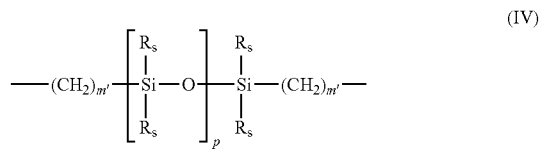
(IV)

wherein:

each Rs independently denotes an alkyl or fluoro-substituted alkyl group having 1 to 10 carbon atoms which may contain ether linkages between carbon atoms;

m' is at least 1; and p is a number that provides a moiety weight of 400 to 10,000;

each of E and E' independently denotes a polymerizable unsaturated organic radical represented by Formula V:

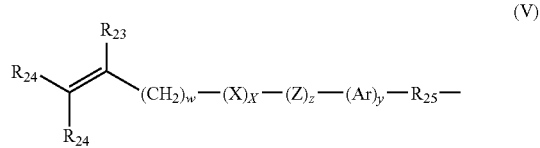
(V)

wherein:

$R_{23}$ is hydrogen or methyl;

$R_{24}$ is hydrogen, an alkyl radical having 1 to 6 carbon atoms, or a —CO—Y—$R_{26}$ radical wherein Y is —O—, —S— or —NH—;

$R_{25}$ is a divalent alkylene radical having 1 to 10 carbon atoms;

$R_{26}$ is a alkyl radical having 1 to 12 carbon atoms;

X denotes —CO— or —OCO—;

Z denotes —O— or —NH—;

Ar denotes an aromatic radical having 6 to 30 carbon atoms;

w is 0 to 6; x is 0 or 1; y is 0 or 1; and z is 0 or 1.

A representative silicone-containing urethane monomer is represented by Formula (VI):

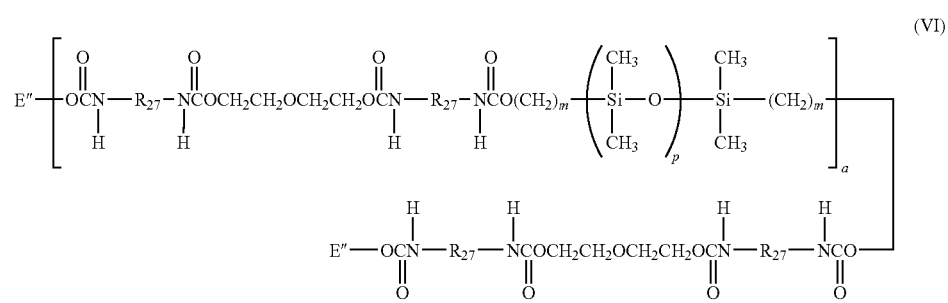
(VI)

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E" is a group represented by:

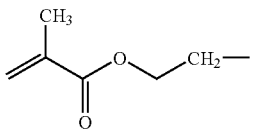

Another class of representative silicone-containing monomers includes fluorinated monomers. Such monomers have been used in the formation of fluorosilicone hydrogels to reduce the accumulation of deposits on contact lenses made therefrom, as described in U.S. Pat. Nos. 4,954,587, 5,079,319 and 5,010,141. The use of silicone-containing monomers having certain fluorinated side groups, i.e. —($CF_2$)—H, have been found to improve compatibility between the hydrophilic and silicone-containing monomeric units, as described in U.S. Pat. Nos. 5,387,662 and 5,321,108.

In one preferred embodiment of the invention, a silicone hydrogel material comprises (in bulk, that is, in the monomer mixture that is copolymerized) 5 to 50 percent, preferably 10 to 25, by weight of one or more silicone macromonomers, 5 to 75 percent, preferably 30 to 60 percent, by weight of one or more polysiloxanylalkyl (meth)acrylic monomers, and 10 to 50 percent, preferably 20 to 40 percent, by weight of a hydrophilic monomer. Examples of hydrophilic monomers include, but are not limited to, ethylenically unsaturated lactam-containing monomers such as N-vinyl pyrrolidinone, methacrylic and acrylic acids; acrylic substituted alcohols, such as 2-hydroxyethylmethacrylate and 2-hydroxyethylacrylate and acrylamides, such as methacrylamide and N,N-dimethylacrylamide, vinyl carbonate or vinyl carbamate monomers such as disclosed in U.S. Pat. No. 5,070,215, and oxazolinone monomers such as disclosed in U.S. Pat. No. 4,910,277. Other hydrophilic monomers will be apparent to one skilled in the art.

Silicone elastomer contact lenses are formed of a silicone elastomer, such as various polydimethylsiloxane materials. In contrast to silicone hydrogel copolymers, silicone elastomers are more rubbery and hydrophobic, generally lack a hydrophilic co-monomer, and do not absorb appreciable amounts of water.

The above silicone materials are merely exemplary, and other materials for use as substrates that can benefit by this invention have been disclosed in various publications and are being continuously developed for use in contact lenses and other medical devices. For illustrative purposes, the following description focuses on silicone hydrogel copolymers, although various aspects of the invention are applicable for silicone elastomer contact lens materials.

Some monomer mixtures for silicone hydrogels include an organic diluent in the initial monomeric mixture that is unreactive with the monomeric components. Suitable organic diluents include, for example, monohydric alcohols, with $C_6$-$C_{10}$ straight-chained aliphatic monohydric alcohols such as n-hexanol and n-nonanol being especially preferred; diols such as ethylene glycol; polyols such as glycerin; ethers such as diethylene glycol monoethyl ether; ketones such as methyl ethyl ketone; esters such as methyl enanthate; and hydrocarbons such as toluene. Generally, the diluent when present is included at five to sixty percent by weight of the initial monomeric mixture, with ten to fifty percent by weight being especially preferred. The diluent may be removed from the contact lens, after casting, by evaporation and/or exchange with an extracting solvent.

Other additives commonly employed in the silicone hydrogel monomer mixture include polymerization initiators, tints, and UV absorbing agents, among others.

The initial monomer mixture is polymerized to form a copolymer. Contact lenses may be manufactured by various conventional techniques, to yield a shaped article having the desired posterior and anterior lens surfaces. As examples, spincasting methods are known, including those disclosed in U.S. Pat. Nos. 3,408,429 and 3,660,545; and static casting methods are known, including those disclosed in U.S. Pat. Nos. 4,197,266 and 5,271,875. Generally, static cast molding involves dispensing the liquid monomer mixture in the mold cavity of a mold assembly including a posterior mold part and an anterior mold part, the posterior mold part including an optical mold surface for forming the posterior contact lens surface, and the anterior mold part including an optical mold surface for forming the anterior contact lens surface. Then, while the monomer mixture is in this mold cavity, the monomer mixture is exposed to thermal energy and/or light energy to cure the monomer mixture and form the copolymer.

According to conventional contact lens manufacturing, the cast contact lens is removed from the mold assembly. The contact lens is typically extracted with a solvent to remove any unrelated monomers or other undesired materials from the cast lens; an organic solvent, such as isopropyl alcohol, water, or an aqueous solution may be used for extraction. The lens is hydrated and packaged in an aqueous solution, whereby the silicone hydrogel copolymer absorbs and retains water, and the packaged contact lens is typically sterilized, such as by autoclaving.

For the methods of this invention, the cast contact lens may be removed from the mold assembly prior to treating the lens. Alternately, the cast contact lens may be retained on a mold part, where one surface of the lens is exposed for treatment. Generally, the lens will be treated by the methods of this invention subsequent to casting of the lens, and prior to a final hydration of the silicone hydrogel copolymer.

This invention provides at least one surface of the contact lens with a wrinkled surface. Both the posterior and anterior surfaces of the contact lens may have this wrinkled surface, or only one of the surfaces may be wrinkled. Additionally, if desired, only selected portions of the posterior and/or anterior surfaces may be wrinkled. According to preferred embodiments, the posterior surface of the lens is wrinkled so as to facilitate improved fluid exchange between the posterior surface of the lens and the cornea while the lens is worn.

The wrinkled surface generally includes a series of raised ridges with depressions therebetween, wherein the raised ridges have heights of 0.5 to 1000 nm with respect to such depressions. More preferably, the raised ridges have heights of 10 to 600 nm with respect to such adjacent depressions. The raised ridges will generally be randomly interspersed. Individual raised ridges may have various shapes, such as circular, cylindrical or curved shapes.

Various contact lens publications seek to achieve a smoother surface, under the theory that a smoother surface will be more comfortable. In contrast, the present invention provides a contact lens with a more textured surface, the textured surface not compromising comfort but providing the contact lens surface with a desired texture, such as to provide the improved fluid exchange between the contact lens and the cornea.

According to various preferred embodiments, the contact lens is initially provided with a modified surface layer, i.e., the surface of the cast contact lens is modified, and subsequently, this modified surface becomes the wrinkled surface. For example, a surface of the lens contact lens may be modified by treating it with plasma, or other energy.

As a further example, the contact lens surface may be modified to provide a silicate surface layer thereon. The silicate surface may be provided by subjecting the surface to strong oxidation, whereby a considerable portion of the silicon at the surface of the lens is converted to silicate. The silicate surface may be formed by plasma treatment of the contact lens surface is an oxygen-containing environment. The plasma surface treatment involves passing an electrical discharge through the oxygen-containing gas at low pressure. The electrical discharge is usually at radio frequency (typically 13.56 MHz), although microwave and other frequencies can be used. The term plasma herein also encompasses corona discharge. The electrical discharge in a plasma is absorbed by atoms and molecules in their gaseous state, thus forming a plasma that interacts with the surface of the contact lens. With an oxidizing plasma, e.g., $O_2$ (oxygen gas), water, hydrogen peroxide, air, and the like, the plasma tends to etch the surface of the lens, creating radicals and oxidized functional groups. Plasma treatment, when using an electric discharge frequency of 13.56 Mhz, is suitably between about 10 and 1000 watts, preferably 100 to 500 watts, a pressure of about 0.001 to 5.0 torr, preferably 0.1 to 1.0 torr, for a time period of about 10 seconds to 60 minutes, preferably about 1-10 minutes. If both surfaces are being treated, the sides may be treated concurrently or sequentially.

As another example, a silicate surface layer may be formed by exposing the contact lens surface to UV radiation in an ozone environment.

After forming the modified surface layer, which in the illustrated embodiment is a silicate surface layer, the contact lens is swelled with a polymerizable swelling agent. This agent is polymerizable, i.e., it is a monomeric material. Preferred agents include ethylenic unsaturation, such that the agent is polymerizable by free radical polymerization. This agent also serves to swell the contact lens copolymeric material which is exposed to the agent. Preferably, the agent swells the contact lens copolymer by at least 15% by volume, more preferably, at least 25% by volume. Representative swelling agents include alkyl (meth)acrylates, especially n-butyl acrylate; alcohol-containing (meth)acrylates, especially 2-hydroxyethyl methacrylate and glyercol methacrylate; and epoxy-containing (meth)acrylates, especially glycidyl methacrylate.

It is preferred that the swelling agent is mixed with a cross-linking monomer, such as a di(meth)acrylated monomer. Representative crosslinking monomers include ethylene glycol dimethacrylate, diethyleneglycol methacrylate, hexamethylene dimethacrylate, among others. It is also preferred that the swelling agent is mixed with a polymerization initiator, for example, a UV initiator if the swelling agent is polymerized with UV radiation, or a thermal initiator if the swelling agent is polymerized with thermal energy.

The contact lens may be immersed in the polymerizable swelling agent. Alternately, the contact lens may be exposed to the polymerizable swelling agent by other methods such as spraying or dip coating. Generally, the contact lens should be exposed to the swelling agent for sufficient time, generally one to ten minutes, so that this agent penetrates beneath the modified surface layer, preferably to a depth of at least 5 nm. Depending on the amount of swelling, the silicate layer will become wrinkled to a varying degree. The particular swelling agent used, and the time of exposure of the contact lens with the swelling agent, may be varied selectively to obtain a desired degree of wrinkling.

At this stage, it is preferred that excess polymerizable swelling agent at the surface of the lens is removed. In other words, it is desirable that there is a greater amount of this agent remains at the depth of 5 nm and below, than nearer the surface. The removal of excess swelling agent may be done by wiping, air blow-off, or the like. If a more vigorous removal method is need, a solvent may be used to remove the excess swelling agent. Suitable solvents are those in which the swelling agent is soluble, for example, acetone, ethanol, isopropanol, and tetrahydrofuran.

Subsequently, the swelling agent is polymerized, such as by exposure to light energy (such as UV radiation) and/or thermal energy. Polymerization of the swelling agent serves to stabilize the wrinkled modified surface layer. In other words, the polymerized swelling agent anchors the wrinkled modified surface layer to the underlying silicone copolymer substrate, resulting in a wrinkled, robust coating that does not delaminate from the contact lens surface and in a wrinkled, durable wettable coating.

Optionally, the surface of the contact lens may be further modified, such as by grafting or plasma-deposition of a material to the surface. For example, in the case where the contact lens includes a silicate surface layer, a carbon layer may be deposited thereon; an example is subjecting the surface to a plasma polymerization deposition with a gas made from a diolefinic compound having 4 to 8 carbon atoms, in the absence of oxygen, thus forming a carbon layer on the surface on the lens; this carbon layer may be rendered hydrophilic by subjecting it to a second plasma oxidation or by applying a secondary coating of a hydrophilic polymer which is attached thereto.

It will be appreciated that various combinations of surface characteristics may be employed. As one specific example, a silicate coating may be formed on both surfaces of the silicone contact lens. The posterior side of the lens is treated for a relatively longer period with the polymerizable swelling agent, so that the posterior silicate surface layer becomes wrinkled, thus providing a textured surface for fluid exchange when the lens is worn. In contrast, the anterior side of the lens is treated for a relatively shorter period with the polymerizable swelling agent, so that the anterior surface has very little or no wrinkling; a carbon coating or other coating may be applied to the silicate surface layer on the anterior surface.

EXAMPLE 1

Table 1 discloses a monomer mixture for forming a silicone hydrogel lens material useful for the present invention.

TABLE 1

| Component | Parts by Weight |
| --- | --- |
| TRIS-VC | 55 |
| NVP | 30 |
| $V_2D_{25}$ | 15 |
| VINAL | 1 |
| n-nonanol | 15 |
| Darocur initiator | 0.2 |
| tint agent | 0.05 |

The following materials are designated above:

| | |
|---|---|
| TRIS-VC | tris(trimethylsiloxy)silylpropyl vinyl carbamate |
| NVP | N-vinyl pyrrolidone |
| $V_2D_{25}$ | a silicone-containing vinyl carbonate as previously described in U.S. Pat. No. 5,534,604. |
| VINAL | N-vinyloxycarbonyl alanine |
| Darocur | Darocur-1173, a UV initiator |
| tint agent | 1,4-bis[4-(2-methacryloxyethyl)phenylamino] anthraquinone |

EXAMPLE 2

Table 2 discloses a monomer mixture for forming a polyurethane silicone hydrogel formulation useful in the present invention.

TABLE 2

| Component | Parts by Weight |
|---|---|
| ID3S4H | 55 |
| TRIS | 20 |
| DMA | 25 |
| UV Absorber | 0.5 |
| n-Hexanol | 20 |
| Irgacure-819 initiator | 0.5 |
| Tint agent | 150 ppm |

The following materials are designated above:

| | |
|---|---|
| TRIS | tris(trimethylsiloxy)silylpropyl methacrylate |
| DMA | N,N-dimethylacrylamide |
| ID3S4H | a polysiloxane-containing urethane prepolymer of Formula (VI) where $R_{27}$ is the residue of isophorone diisocyanate, and having a molecular weight about 4000. |
| Irgacure-819 | a UV initiator |

EXAMPLE 3

Table 3 discloses a monomer mixture for forming a polyfumarate silicone hydrogel formulation useful in the present invention.

TABLE 3

| Component | Parts by Weight |
|---|---|
| $F_2D_{20}$ | 20 |
| TRIS | 40 |
| DMA | 40 |
| n-Hexanol | 5 |
| Darocur initiator | 0.5 |
| Tint Agent | 150 ppm |

The following materials are designated above:

| | |
|---|---|
| TRIS | tris(trimethylsiloxy)silylpropyl methacrylate |
| DMA | N,N-dimethylacrylamide |
| $F_2D_{20}$ | a silicone-containing crosslinking resin as previously described in U.S. Pat. Nos. 5,374,662 and 5,496,871. |

EXAMPLE 4

This Example illustrates a process for forming silicone hydrogel contact lenses for a method of this invention. The monomer mixture of Table 2 was injected onto a clean polypropylene anterior mold half and covered with the complementary polypropylene posterior mold half. The mold halves were compressed, and the mixture was cured by exposure to UV radiation. The top mold half was removed, and the lenses were maintained in a forced air oven to remove the majority of the n-hexanol diluent. The lenses are removed from the bottom mold half, extracted in isopropanol, and then dried.

EXAMPLE 5

The lenses are placed in a Branson RF plasma unit (13.56 MHz), or similar unit, on a tray which elevates the lenses between two electrodes and allows the flow of gas around the lenses. The plasma unit is evacuated of air, then oxygen gas or air is introduced into the chamber, and the plasma is ignited. After completion of the plasma treatment, the lenses are removed from the plasma unit and immersed in a mixture consisting of n-butyl acrylate (75%), ethylene glycol dimethacrylate crosslinker (25%) and photoinitiator (Igracure® 819 initiator). This acrylate-containing mixture is allowed to remain on the silicate layer until such time has evolved that sufficient penetration by the swelling agent into the silicone hydrogel has taken place, typically, but not limited to 1-5 minutes, and the silicate layer assumes a wrinkled texture. After this time the excess acrylate-containing mixture is removed by wiping the surface with a clean cloth containing acetone. The lens samples are then placed in a chamber and exposed to UV radiation, to polymerize the n-butyl acrylate monomer mixture that has imbibed into the silicone hydrogel copolymer. The lenses are then hydrated in deionized water until equilibrated, followed by placing in borate buffered saline and autoclaving at about 120° C.

Optionally, prior to hydration, an additional coating may be added to the posterior surface, the anterior surface, or both these surfaces.

As an alternative to forming a silicate coating on the lens surface, plasticizers may be used to create the wrinkled surface. An illustration of this approach involves, initially, abstracting hydrogen from the desired lens surface or portions thereof. For example, a polymerization initiator may be applied to the contact lens surface; commercially available initiators include benzophenones, thioxanthones, and phosphine oxides, including those available under the tradenames Irgacure and Darocur. An initiator-containing solution is applied to and reacted with the lens surface, such as by spray coating, a gas nebulizer or transfer to the surface from the contact lens mold.

Once hydrogen is abstracted from the upper (near) regions of the lens surface, free radicals will remain which are available to react with vinyl-containing plasticizers in the near surface region. Such plasticizers preferably include (meth) acrylate functionality, such as: (meth)acrylated silicone based materials, like (meth)acrylated poly(dimethyl siloxane)s; and (meth)acrylated aromatic-containing compounds, like phenoxyethyl acrylate, isoborneol acrylate, or benzyl acrylate. Other specific examples include:

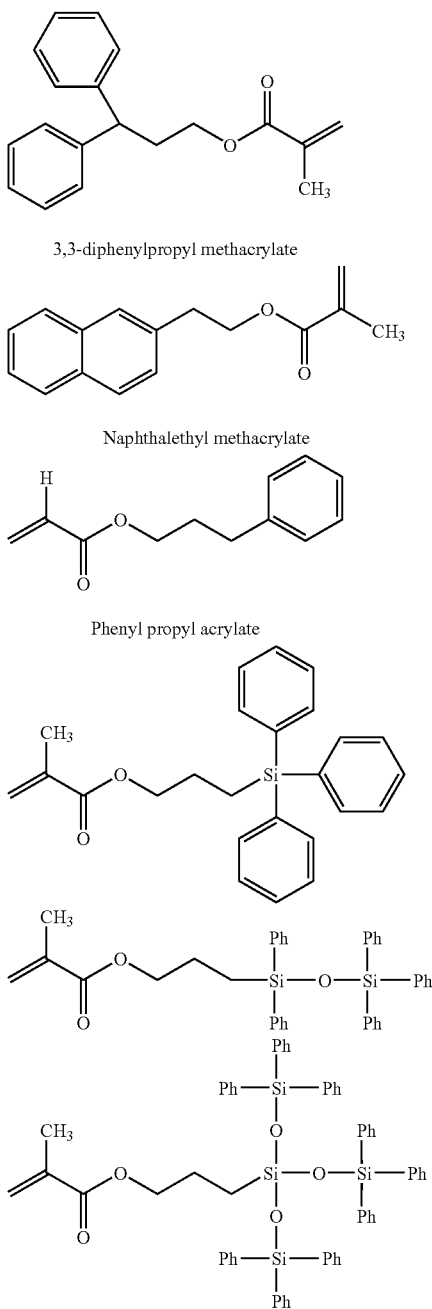

3,3-diphenylpropyl methacrylate

Naphthalethyl methacrylate

Phenyl propyl acrylate

These (meth)acrylated plasticizers may be applied to the lens surface by the aforementioned methods of such as by spray coating, a gas nebulizer or transfer to the surface from the contact lens mold, followed by curing, including application of heat, UV radiation or visible light. Then, the contact lens may be treated with the swelling agents, discussed above. Generally, these plasticizers are chosen so that once cured in the near region of the contact lens, the resulting polymers have a different polymer backbone structure and/or modulus from the contact lens bulk copolymer. Infusion with swelling agents like n-butyl acrylate create wrinkles, as disclosed above.

As a further alternative, the contact lens bulk copolymer may include a co-monomer that provides the lens surface with residual allyl groups. Examples of such co-monomers, included in the initial monomer mixture used to cast the contact lens, are allyl (meth)acrylates. The (meth)acrylate functionality of this co-monomer reacts with the other co-monomers in the monomer mixture, whereas the allyl functionality remains in the near region of the contact lens. The allyl functionality may be reacted with a hydrocarbon or silane compound with thio end groups. The hydrocarbon or silane compound is a compound able to swell the contact lens bulk copolymer, and further containing at least one thio end group for reacting with the residual allyl functionality of the bulk contact lens copolymer. The thio-terminated compounds will covalently bind to the exposed allyl groups which will allow the hydrocarbon and silane materials to interact and swell the polymer in the near surface region, thus creating a mismatch in polymer backbone and/or modulus. Then, a swelling agent such as n-butyl acrylate may then be infused, as discussed above.

As an additional alternative, various polymeric materials, including polylactides, polyglycolides, polydioxananes, polycaprolactones, polyethylene glycols, polypropylene glycols, polyethylene and propylene oxides, fluorocarbons, fluorosiloxanes, polyurethanes, and copolymers thereof, have polymeric backbones and moduli that differ from the contact lens bulk copolymer. The use of a thin film or infused layer may be incorporated onto or within the contact lens, to establish a polymer backbone and/or modulus mismatch which will induce stress and ultimately promote wrinkling once a swelling agent is infused into the polymer.

For any of the aforementioned methods, portions of the contact lens surface may be masked during treatment, such that the masked portions exhibit less wrinkling than the unmasked portions.

It will be understood that various modifications may be made to the embodiments disclosed herein. Therefore the above description should not be construed as limiting, but merely as exemplifications of preferred embodiments. Other arrangements and methods may be implemented by those skilled in the art without departing from the scope and spirit of this invention. Moreover, those skilled in the art will envision other modifications within the scope and spirit of the features and advantages appended hereto.

We claim:

1. A method of making a contact lens comprising:
   providing a silicone contact lens with a modified surface layer;
   swelling the contact lens with a polymerizable swelling agent; and
   polymerizing the swelling agent;
   whereby the modified surface layer becomes a wrinkled surface.

2. The method of claim 1, wherein the contact lens is comprised of a silicone hydrogel copolymer.

3. The method of claim 2, wherein the silicone hydrogel lens is oxidized with plasma to form a silicate surface layer.

4. The method of claim 2, further comprising, following the modified surface layer becoming a wrinkled surface, hydrating the contact lens, whereby a wrinkled surface is retained on the hydrated contact lens.

5. The method of claim 2, wherein a surface of the silicone hydrogel lens is treated with a vinyl-containing plasticizer, prior to exposure to the swelling agent.

6. The method of claim 1, wherein a posterior surface of the contact lens is provided with the modified surface layer, and the posterior surface modified surface layer becomes wrinkled.

7. The method of claim 1, wherein the wrinkled surface includes raised ridges.

8. The method of claim 7, wherein the raised ridges have heights of 0.5 to 1000 nm.

9. The method of claim 8, wherein the raised ridges have heights of 10 to 600 nm.

10. The method of claim 7, wherein the wrinkled surface covers an entire surface of the contact lens.

11. The method of claim 7, wherein the wrinkled surface covers a selected portion of a contact lens surface.

12. The method of claim 1, comprising:
   providing a silicone contact lens with a modified surface layer;
   exposing the contact lens to a polymerizable swelling agent, and removing at least some of the swelling agent at the contact lens surface, with swelling agent remaining below the modified surface layer; and
   polymerizing the swelling agent;
   whereby the modified surface layer becomes a wrinkled surface.

13. The method of claim 1, further comprising grafting a surface agent to the wrinkled modified surface layer.

14. The method of claim 1, wherein one lens surface is wrinkled and the other lens surface comprises a surface agent grafted thereto.

* * * * *